Oct. 2, 1934.  P. B. PARKS ET AL  1,975,614
THERMOSTATIC CONTROL CIRCUIT
Filed Jan. 23, 1933
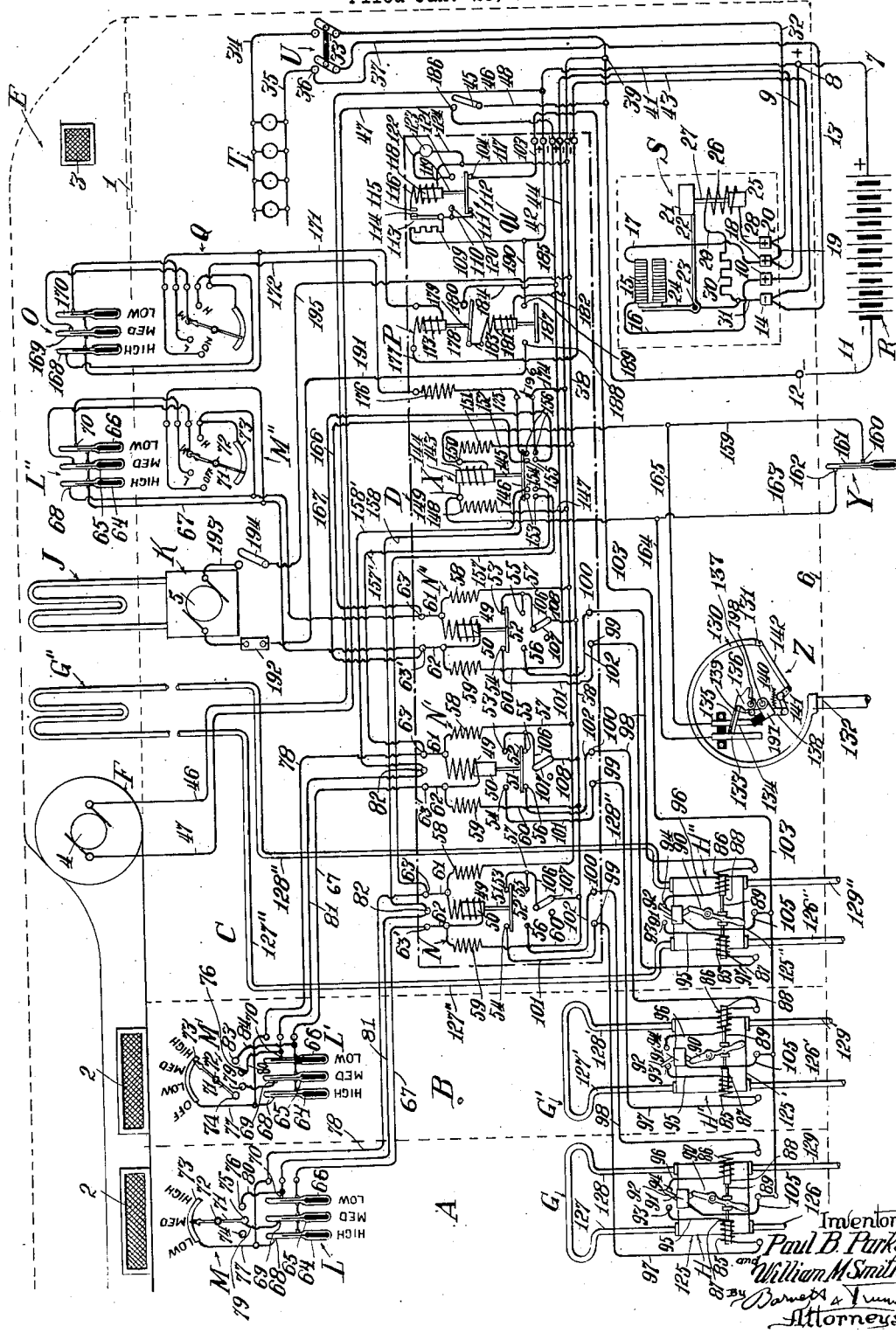
Inventors
Paul B. Parks
and William M. Smith
By Barnett & Truman
Attorneys.

Patented Oct. 2, 1934

1,975,614

UNITED STATES PATENT OFFICE 1,975,614

THERMOSTATIC CONTROL CIRCUIT

Paul B. Parks, Oak Park, and William M. Smith, Chicago, Ill., assignors to Vapor Car Heating Company, Inc., Chicago, Ill., a corporation of New York Application January 23, 1933, Serial No. 653,078

13 Claims. (Cl. 236—1)

This invention relates to certain new and useful improvements in a temperature regulating system, and more particularly to an automatically operating thermostatically controlled system comprising both a heating means and a refrigerating means, said system functioning to maintain selected temperatures within an enclosure. While the invention has been designed more particularly for use in a railway car or other moving vehicle, many of the features thereof are equally adaptable for use with stationary enclosures, such as rooms of ordinary buildings.

Briefly described, the railway car which may be divided into a plurality of separate compartments is provided with an air circulating system comprising a passage into which air is withdrawn from the car and forced out at a plurality of selected locations by means of a power-driven blower. Separate heating and refrigerating means are positioned in this passage for regulating the temperature of this circulated air. Separate heating means are also provided for each of the separate compartments for independently regulating the temperature of the air in each of these compartments. Separate electrically operated thermostatically controlled mechanisms are provided for each of the several heating and refrigerating means, these control mechanisms being each manually adjustable to establish a predetermined selected temperature. Located at some convenient position in the car, or other structure to be heated, is a panel board in or on which are positioned all of the relays and similar devices through which the several thermostatic mechanisms control the temperature regulating devices. Included among these devices grouped on the control panel is an automatic circuit breaker comprising a signal light which is illuminated when one of the actuating circuits is broken. By opening or closing test switches in the several circuits, the circuit in which trouble is located can quickly be determined by means of this signal device. A thermostat positioned outside the car or other enclosure and responsive to outside temperatures operates through a selector relay on the panel board to determine whether the heating means or the refrigerating means shall be effective at any one time. In the case of a railway car, a pressure operated selector switch which is normally held open by the fluid pressure existing in some service pipe line on the car when the car is in service, operates through the selector relay on the panel board when the car is out of service to render the heating means incapable of maintaining more than a predetermined low temperature within the car. Other improved features of the invention will be more apparent from the detailed description given hereinafter.

The principal object of this invention is to provide an improved automatically operating thermostatically controlled apparatus for regulating the temperature within an enclosure, such as briefly described hereinabove and disclosed more in detail in the specifications which follow.

Another object is to provide a temperature regulating apparatus comprising heating means and cooling means, and thermostatic mechanism positioned outside the enclosure and responsive to outside temperatures for determining whether the heating means or the cooling means shall be effective.

Another object is to provide an improved thermostatic control mechanism in which the operating relays and associated mechanisms are grouped on a single control panel.

Another object is to provide such a control system with a single selector relay which cooperates with the several heating and refrigerating mechanisms to determine whether or not the refrigerating means shall be operative, and to establish a minimum temperature to be maintained by certain of the heating mechanisms.

Another object is to provide means for controlling the voltage in certain of the circuits, and for automatically breaking certain of the other circuits when an excessive or prolonged current flows through these circuits.

Another object is to provide a single selector relay which is alternatively controlled by either an outside thermostat or a pressure-operated switch for establishing a predetermined minimum temperature within the car whenever either the outside temperature has risen above a predetermined maximum, or the car has been taken out of service.

Other objects and advantages of this invention will be more apparent from the following detail description of one approved mechanism constructed and operated according to the principles of this invention.

The accompanying drawing is in the form of a wiring diagram illustrating conventionally the construction and operation of the several component parts of the system.

At A, B and C are indicated three separate compartments in the railway car. The compartment A may be a wash-room or lavatory, and the compartment B may be a passenger compartment or drawing room. It is to be understood that there may be a plurality of compartments similar to the compartments A or B, and that each of these compartments will be separately equipped with temperature regulating mechanisms of the type hereinafter disclosed in each of these compartments. The compartment C indicates a separate space or plurality of spaces, such as a closet at one end of the car, in which the control panel indicated at D and similar devices may be conveniently grouped. A passage E is provided, preferably in the upper portion of the car, into which air from within the car is drawn through the grilled opening 1 and discharged through separate openings such as 2 into the several compartments. A certain percentage of fresh air from outside the car may be admitted to passage E through a valved inlet opening such as indicated at 3. A fan or blower F, driven by a motor 4, is provided for enforcing the circulation of air through passage E.

Each compartment A and B is provided with a heating unit such as the radiator or radiators indicated at G and G', the circulation of steam or other heating medium through the radiators being controlled by the electrically operated distributing valves H and H' respectively. A heating unit G'' is positioned in the passage E, the flow of heating medium to this unit being controlled by the valve H''. A refrigerating element such as indicated by the coil J is also positioned in circulation passage E, the supply of refrigerant for coil J being provided by the refrigerating mechanism K positioned at any convenient location on the car and driven by the motor 5.

A thermostatic control assembly indicated generally at L and provided with a manually operable mechanism M for selecting the temperature to be maintained is positioned within the compartment A and cooperates with a control relay N on panel board D to operate the distributing valve H. Similar devices L', M' and N' are provided for each compartment B. The thermostatic assembly L'' which through relay N'' controls the valve H'' for supplying heating medium to the radiator G'', is positioned in passage E so as to be subject to temperature changes in the air stream flowing through this passage. The adjusting mechanism M'' for this unit is positioned in any convenient location, for example in the compartment C. A thermostatic assembly O, also positioned in passage E, cooperates with a relay mechanism indicated generally at P on the panel board for controlling the refrigerating means K. The manually adjustable mechanism Q for setting the thermostatic control mechanism O is positioned in any convenient location, preferably adjacent the control mechanism M''. The power source indicated at R supplies electric power for all of the control and motor mechanisms within the car, and through the voltage regulator indicated at S supplies power to the car lighting system indicated at T. At U is indicated the main cut-out switch for the lighting system, and as will be hereinafter apparent this switch U when opened also opens some of the control circuits hereinafter described. At W on the panel board is indicated an automatically reclosing circuit breaker which is adapted to open the actuating circuit for one or more of the valve operating mechanisms H whenever one of these valves sticks or otherwise becomes inoperative and an excessive current flows through these circuits. The selector relay X on the panel board cooperates with the several control relays N and P to determine whether the heating means or the refrigerating means shall be effective, and to establish, under certain circumstances, a minimum temperature to be maintained by the heating means. The selector relay X is controlled by a thermostat Y positioned outside of the car or other enclosure so as to be responsive to outside temperatures. The relay X is also, and alternatively, under the control of a selector switch Z which is pressure-operated and connected with a pipe line on the car which normally contains fluid under pressure when the car is in service.

The several elements of this system, and the wiring connections therefor, will now be described somewhat more in detail. It is to be understood that all of the devices shown in the drawing above the floor line 6 of the car will ordinarily be positioned within the car or other enclosure, whereas the devices shown below this floor line will ordinarily be positioned below the car or in some other convenient location outside of the car compartments.

The source of power R is here shown simply as a storage battery, although it will be understood that, in the case of a railway car, a generator driven from the running gear of the car will be provided as usual to furnish power when the car is in motion and restore the battery. The positive terminal of the battery is connected through a wire 7 with positive terminal 8 from which wire 9 leads to a positive terminal 10 of the voltage regulator S. Wire 11 leads from the negative terminal of the battery to a negative terminal 12.

The voltage regulator S, which is of well known type, comprises a stack of resistance carbons 15, one terminal of which is connected through wire 16 with the terminal 10, the other terminal of the stack being connected through wire 17 with a terminal 18 which is connected by wire 19 with a terminal 20. A weight 21 is positioned on one arm 22 of a bellcrank lever pivoted at 23, the other arm 24 of this bellcrank pressing against one end of the carbon stack 15 to compress the same and minimize the resistance thereof. The core 25 of a solenoid 26 is connected through stem 27 with the weighted arm of the bellcrank. When the solenoid is energized, the core 25 will be elevated so as to raise the weight 21 thereby decreasing the pressure of arm 24 on the carbon resistance 15 so as to increase the effective resistance of this carbon stack. A partial circuit for energizing solenoid 26 leads from terminal 20 through wire 28, solenoid coil 26, wire 29, resistance 30, and wire 31 to the terminal 14, thence through wire 13 to fixed contact 36 of switch U and through wire 37 to the negative terminal 12.

When the main switch U is closed, the lights T may be energized through the following circuit: From positive terminal 8 through wire 9, terminal 10, wire 16, resistance stack 15, wire 17, terminal 18, wire 19, terminal 20, wire 32, movable arm 33 of cut-out switch U, wire 34, lights T, wire 35, fixed terminal 36 of switch U, and wire 37 to the negative terminal 12. At the same time current will flow through the partial shunt circuit already described which energizes solenoid 26. As the voltage tends to increase and a greater current flows through this solenoid coil, the core 25 will be elevated so as to raise the weight 21 and decrease the pressure on carbon stack 15, thereby increasing the resistance of this carbon stack which is interposed in the lighting circuit thereby decreasing the effective voltage in the lighting circuit and maintaining this voltage at or below a predetermined maximum. It is to be understood that individual switch mechanisms will be provided for the component parts of the lighting system indicated generally at T, only the main cut-out switch U being shown.

A main negative supply line 38 on the panel board D connects at 39 to the wire 37 leading to the negative terminal 12. Wire 41 leads from the main positive terminal 8 to the positive supply line 42 on the panel board which in turn leads to the circuit breaker W. The circuits supplied from wire 42 through the circuit breaker W do not extend through the voltage regulator S. A wire 43 leads from positive terminal 18 of the voltage regulator to the positive supply line 44 on the panel board from which the several thermostatic control circuits hereinafter described are energized. These circuits do not pass through the circuit breaker W, but the voltage in these control circuits is maintained below a predetermined maximum by the regulator S.

The blower-motor 4 is controlled by the switch 45 and is energized through the following circuit: From positive terminal 8 through wire 41, wire 46, motor 4, switch 45, and wires 48 and 37 to the negative terminal 12.

Each of the relays N, N' and N'' comprises a solenoid coil 49 which, when energized, will draw up a core 50 connected by stem 51 to a movable contact plate 52 so as to bring this contact plate into position to bridge a pair of fixed contacts 53 and 54. When the coil 49 is deenergized, or insufficiently energized, the core 50 will drop so as to bring contact plate 52 into position to bridge the fixed contacts 55 and 56. The solenoid coil 49 is normally energized so as to hold the contact plate 52 in its elevated position (as now shown in connection with relays N and N'') by means of a circuit extending from positive supply line 44 through wire 57, resistance 58, solenoid coil 49, resistance 59, and wire 60 to the negative supply line 38. Wires 61 and 62 lead from the respective terminals of solenoid coil 49 to a pair of binding posts 63 and 63' on the panel board D. Control circuits leading from the thermostatic mechanism L (or the mechanisms L' or L'' as the case may be) connect with the binding posts 63 and 63' so that when a certain predetermined temperature is reached in the compartment A (or compartment B or passage E) the energizing circuit for solenoid coil 49 will be short-circuited through the thermostatic mechanism thereby deenergizing the solenoid and permitting the contact plate 52 to drop into engagement with the lower fixed contacts 55 and 56 (as shown for example in connection with the relay N'').

Each of the thermostatic mechanisms L, L' and L'' comprises a plurality of similar mercury tube thermostats, in the present example the three thermostats 64, 65 and 66. A wire 67 leads from binding post 63' on the panel board and connects into the lower portion of each of the thermostats so as to be in constant engagement with the mercury column therein. A terminal 68 is positioned in the tube of thermostat 64 (which may be called the "high temperature thermostat") so that this terminal will be engaged by the mercury column when a temperature of, for example, 72° Fahrenheit is reached in the compartment A. A similar terminal 69 is fixed in mercury tube 65 which may be called the "medium temperature" thermostat so as to be engaged by the mercury column of this thermostat at a temperature of, for example, 70° Fahrenheit. Similarly the fixed contact 70 in the "low temperature" thermostat 66 is engaged by the mercury column at a temperature of, for example, 60° Fahrenheit. By means of the manually adjusted switch mechanism indicated generally at M the system may be placed under control of any one of these three thermostats. This switch comprises an indicating lever 71 pivoted intermediately at 72 and in constant engagement at its upper end with the fixed arcuate contact plate 73. The other end of lever 71 is adapted to engage alternatively with some one of the fixed contacts 74, 75 or 76. A wire 77 connects terminal 68 of the high temperature thermostat with the fixed contact plate 73. A wire 78 connects wire 77 with the binding post 63 on the panel board. A wire 79 leads from fixed contact 69 of the medium temperature thermostat to the fixed contact 75, and a wire 80 leads in a similar manner from fixed contact 70 of the low temperature thermostat to the fixed contact 76. There is no wire connection with the contact member 74. Another wire 81 leads from the fixed contact 70 of the low temperature thermostat to a binding post 82 on the panel board for a purpose hereinafter described, this wire not being used in the normal operation of the thermostatic control mechanism.

With the switch M adjusted to the position shown in compartment A, the medium temperature thermostat 65 will be in control. When the predetermined temperature is reached in the compartment A, a shunt circuit will be completed around the solenoid coil 49 as follows: From binding post 63 through wires 78 and 77, contact plate 73, switch lever 71, terminal 75, wire 79, thermostat 65, and wire 67 back to binding post 63'. This will serve to deenergize the solenoid and permit the contact plate 52 to fall to its lower position in engagement with fixed contacts 55 and 56. This will complete an operating circuit which will move the valve H to a closed position, as hereinafter described. When the temperature in compartment A falls below the predetermined temperature for which thermostat 65 is set, the shunt circuit just described will be broken at the terminal 69 and solenoid 49 will again become energized so as to raise the contact plate 52 into engagement with the fixed contacts 53 and 54, thus completing an operating circuit which will move valve H to its open position. If the switch lever 71 is moved to the "high" position so that its lower end is in engagement with contact 74, none of the circuits can be complete through this lever and only the high-temperature thermostat 64 is capable of completing a shunt circuit to deenergize the relay N. If switch lever 71 is moved to the "low" position so that its lower end is in engagement with contact 76, a shunt circuit for deenergizing relay N will be completed as soon as the mercury column of low-temperature thermostat 66 engages the fixed contact 70. The valve H will thus be closed to cut off the flow of heating medium to radiator G as soon as the temperature in compartment A has reached the comparatively low temperature for which thermostat 66 is set, and the temperature will never rise high enough to cause the medium or high temperature thermostats 65 or 64 to be effective.

In an exactly similar manner the thermostatic assembly L' in compartment B acts through relay N' to control the valve H' which regulates the flow of heating medium to the radiator G' in compartment B. It will be noted that the switch mechanism M' in compartment B differs from the switch mechanism M in compartment A in having an additional "off" position in which the upper end of switch lever 71 is in engagement with arcuate contact plate 73 and the lower end in engagement with a fixed contact 83. When in this position a shunt circuit for deenergizing the relay N' is always completed, regardless of the thermostats L', through the following circuit: From binding post 63 through wire 76, wire 77, arcuate contact 73, switch lever 71, fixed contact 83, wire 84, and wire 67 to the binding post 63'. This permits the heat to be entirely shut off when desired. With the type of control shown in compartment A, the heat can never be entirely cut off by means of the control mechanism M', but will always keep a minimum low temperature in the compartment.

The control mechanism M" is similar to the control mechanism M' and cooperates with the thermostatic assembly L" in passage E and the relay N" on the panel board to control the valve H", which in turn controls the flow of heating medium to the heating unit G" in the air passage E.

The electrically actuated valve-operating mechanisms for each of the valves H, H' and H" are similar, and each comprises a pair of solenoid motors 85 and 86, having cores 87 and 88, respectively, mounted at the opposite ends of a slide rod 89 which is intermediately connected with one arm of the valve operating lever 90. The opposite end of lever 90 is connected with a snap switch 91 having a movable contact arm 92 which is snapped out of engagement with a fixed contact 93 and into engagement with a fixed contact 94 when valve-lever 90 reaches the open position shown in valve H, and which is snapped out of engagement with fixed contact 94 and into engagement with fixed contact 93 as the valve reaches the closed position shown in valve H'. The fixed contacts 93 and 94 of the snap switch are connected through wires 95 and 96, respectively, with one terminal of each of the solenoid coils 85 and 86. The other terminals of these coils are connected through wires 97 and 98, respectively, with a pair of binding posts 99 and 100 on panel board D adjacent the relay N. Wire 101 leads from binding post 99 to fixed contact 54 of the relay N, and wire 102 leads from binding post 100 to the fixed contact 56 of this relay. The wire 103 leads from the fixed contact 104 of the circuit breaker W on the panel board, and connects through the several wires 105 with the movable contact members 92 of the several snap switches 91 of the valve mechanisms. The two fixed contacts 53 and 55 of each relay N are connected through wire 106 with the movable contact arm 107 of a cut-out or test switch, the fixed contact of which is connected through wire 108 with the negative main 38 on the panel board.

The circuit breaker W is preferably of the automatic re-closing type disclosed more in detail and claimed in the copending application of Parks and Miller, Serial No. 609,463, filed May 5, 1932. The current for the valve-operating circuit flows from the positive terminal of the source of power R through wires 41 and 42, thermal resistance 109, wire 110, fixed contact 111, movable contact plate 112, fixed contact 104 and through wire 103 to and through one or more of the respective valve-operating circuits, as hereinafter described. When an overload occurs in one or more branches of the valve-operating circuits, or when the circuit flows for an excessive length of time, the thermal resistance 109 will heat the bi-metallic thermostatic bar 113 so as to cause this bar to warp and bring the movable contact 114 into engagement with the fixed contact 115 thus completing a shunt circuit extending through the solenoid coil 116 and wire 117 to the negative main 38. The solenoid 116, when thus energized, will lift the core 118 which is connected through stem 119 with the movable contact plate 112 so as to break the valve-operating circuits between the fixed contacts 111 and 104. At the same time an energizing circuit will be completed through the signal light 123 (or equivalent signal device) this circuit being as follows: From positive wire 110 through fixed contact 120, movable contact plate 112, fixed contact 121, wire 122, signal light 123, and wires 124 and 117 to the negative main 38. The lamp 123 will remain lighted as long as the circuit breaker is in open position. When the thermostatic bar 113 cools, it will warp back so as to separate the contacts 114 and 115 and break the energizing circuit for solenoid 116, but means (not here shown) are provided to delay this action so that the main operating circuits will remain broken for an appreciable length of time. When the solenoid 116 is thus deenergized, the movable contact plate 112 will again drop into engagement with the fixed contacts 111 and 104 thus again completing the valve-operating circuits. If the overload or other trouble still remains in one or more of these operating circuits, the thermostatic bar 113 will again be heated and will warp so as to close the energizing circuit for solenoid 116 thus again breaking the valve-operating circuit, and the lamp 123 will again be lighted to indicate this condition. This cycle of events will repeat themselves until the trouble is eliminated.

In describing the normal operation of one of the valve-operating mechanisms, we will assume that the parts are initially in the position shown in compartment A. The medium temperature thermostat 65 is in control, the temperature at this time is somewhat below the predetermined temperature for which this thermostat is set, and the valve H is open so that heating medium is being supplied to the radiator or radiators indicated at G. It may here be stated that the valve H (or H' or H" as the case may be) comprises a casing 125 in which is a movable valve member controlled by the intermediately pivoted lever 90. In the example here shown, the valve being part of a vapor heating system, steam or vapor flows into the valve through pipe 126, and if the valve is in the open position as shown flows out through pipe 127 to and through the radiator G, then back to the valve casing through pipe 128, and out through pipe 129 to the vapor-regulator beneath the car. When the valve lever 90 is swung over to the opposite position, as shown in valve H' in compartment B, the valve will be closed and the steam will flow into casing 125' through pipe 126' and directly back to the vapor regulator through pipe 129', but will not flow out through the radiator G'. It may here be noted that while the valve H" may be positioned at any desired location in the car and operates in the same manner as the valves H and H', it is connected through the pipes 127" and 128" with the radiator G" positioned in the overhead air passage E.

Returning now to the description of the heating system in compartment A, it will be noted that at this time the relay N is energized and the movable contact plate 52 is held in its elevated position. When the temperature in compartment A reaches the desired maximum, the control circuit through medium temperature thermostat 65 will be completed, the relay N will be short-circuited, and the movable contact plate 52 will drop so as to bridge the fixed contacts 55 and 56. A valve operating circuit will now be completed as follows: From positive supply line 42 through the circuit breaker W, wire 103, wire 105, contacts 92 and 94 of snap switch 91, wire 96, solenoid motor 86, wires 98 and 102, fixed contact 56, movable contact 52 and fixed contact 55 of the relay N, wire 106, test switch 107, and wire 108 to the negative main 38. The solenoid motor 86 will now be energized to swing the valve to the closed position, and at the end of this movement the snap switch will be operated to break the circuit just described between the contacts 92 and 94, the parts now being in the positions indicated in connection with valve H' in compartment B. When the temperature in the compartment A falls again so as to break the control circuit through the thermostat 65, the relay coil 49 will again be energized to lift the contact plate 52 to the position shown in relay N, whereupon a second operating circuit will be completed as follows: As in the circuit last described through wire 105, contacts 92 and 93 of snap switch 91, wire 95, solenoid coil 85, wire 97, wire 101, fixed contact 54, movable contact 52 and fixed contact 53 of relay N, and wire 106 to the negative main 38. The solenoid motor 85 will now be energized to return the valve and associated parts to the positions now shown in connection with valve H.

It will be noted that in compartment B the high temperature thermostat 64 is in control, that this temperature has been reached in this compartment, and that the valve H' is closed. In the air passage E, the system is under the control of the medium temperature thermostat, the temperature is still below the temperature for which this thermostat is set, and valve H'' is open.

It will be noted that a test-switch 107 is provided adjacent each relay N on the panel board, and whichever valve-operating circuit is otherwise complete can be broken by opening this test-switch 107. As already noted, whenever there is an excessive current flow in any of the valve-operating circuits, the circuit breaker W will operate to break this circuit and cause the signal lamp 123 to be lighted. By successively and separately opening the several test switches 107, and observing the action of the signal lamp 123 and circuit breaker W, the circuit in which trouble occurs may be localized. Until this trouble is eliminated, this particular valve mechanism may be cut out of operation by leaving open its switch 107, without affecting the continued operation of any other portion of the control system.

When a car is taken out of service for any considerable length of time, it is not necessary or economical to maintain the compartments at one of the higher temperatures, but it is desirable in order to prevent injury to the car and its contents not to permit the temperature to drop below a certain predetermined low temperature, for example the temperature which is maintained by the low temperature thermostats 66. Means is provided, therefore, to automatically maintain all of the compartments at this low temperature when the car is out of service no matter what the positions of the several manually adjustable switches M may be. This portion of the mechanisms comprises the fluid-pressure operated selector switch Z, and the selector relay X on the panel board. The switch Z comprises a Bourdon tube 130 closed at its free end 131 and connected at its fixed end 132 with one of the air pressure pipe lines on the car. A pair of spring contact members 133 and 134 are normally out of engagement with one another but are adapted to be bridged by a movable contact bar 135 carried by the cam member 136 pivoted at 137. The vertically movable bar 138 carries a roller 139 at its upper end which bears against the cam 136, being held in this position by spring 140, and the lower end of bar 138 is connected through bellcrank 141 and link 142 with the free end 131 of Bourdon tube 130. When normal fluid pressure is present in the pipe line on the car, the Bourdon tube will be expanded to the position shown in the drawing, thereby pulling down rod 138 so that the engagement of roller 139 with cam 136 will force the movable contact bar 135 up to the position shown in which it is out of contact with either of the spring contacts 133 and 134. When the car is out of service and air pressure in the pipe line is dissipated, the Bourdon tube 130 will coil inwardly or contract so as to move the roller 139 upwardly. The upper surface of cam 136 will then be engaged so as to snap the contact bar 135 downwardly into position to bridge the two spring contacts 133 and 134.

The selector relay X, positioned on the panel board, comprises a solenoid coil 143 which when energized will draw up the core 144 connected by stem 145 with the contact plate 146. This solenoid coil is normally energized over the following circuit: From positive main 44 on the panel board through wire 147, resistance 148, binding post 149, solenoid coil 143, binding post 150, resistance 151, and wire 152 to the negative main 38. Several similar pairs of cooperating contact members 153, 154, 155 and 156 each comprise one fixed contact member and one movable contact member carried by the movable plate 146. When solenoid 143 is energized and the plate 146 is held in the elevated position shown in the drawing, each of these pairs of contact members will be separated. When the solenoid 143 is deenergized, the plate 146 will be lowered so as to bring the several pairs of contact members into engagement and separately complete a plurality of independent circuits. The two relatively movable contact members 153 are connected through wires 157 and 158 with the two binding posts 63 and 82 associated with the relay N. In a similar manner, the contact members 154 are respectively connected through wires 157' and 158' with the binding posts 63 and 82 of the relay N'.

The outside thermostat Y is located in any suitable position outside of the car so as to be responsive to changes in the outside temperature, preferably being positioned in a protective casing beneath the car body. A wire 159 leads from one terminal 150 of solenoid 143 to a fixed contact member 160 in constant engagement with the mercury column 161 of the thermostat Y. An upper contact member 162 of the thermostat is connected through wire 163 with the other terminal 149 of relay solenoid 143. When a certain predetermined outside temperature is reached, for example 70° Fahrenheit, the mercury column 161 will engage the fixed contact 162 thereby completing a shunt circuit around the solenoid coil 143 so as to deenergize the same and permit the contact plate 146 to drop and bring together the several respective pairs of contact members 160

153, 154, 155, and 156 (it being understood that another pair of these contacts will be added for every relay such as N which is added to the system).

The spring contact 133 of selector switch Z is connected through wire 164 with the wire 163. In the same manner spring contact 134 of the selector switch is connected through wire 165 with the wire 159. Therefore when the car is taken out of service and the fluid pressure is dissipated from the pipe with which Bourdon tube 130 is connected, the switch Z will be closed so as to complete a second shunt circuit which will deenergize the selector relay K. Whenever the car is taken out of service and the switch Z is closed so as to deenergize the relay K, an operating circuit for low temperature thermostat 66 in compartment A will be completed as follows: From binding post 63 through wire 157, contacts 153, wire 158, binding post 82, wire 81, low temperature thermostat 66, and wire 67 to binding post 63'. Thus, even though the medium or high thermostats 65 or 64 may be connected in service by switch M, an auxiliary operating circuit is thus completed through the low temperature thermostat 66 so that the valve H will be operated to cut off the flow of heating medium to radiator G whenever the temperature in compartment A rises above the minimum temperature for which thermostat 66 is adjusted. In other words, no matter what the setting of switch M may be, the compartment A will be automatically maintained at a minimum temperature whenever the car is taken out of service. The deenergization of relay K will complete a similar control circuit for each of the compartments A or B.

It will be noted that in the case of the relay N'' and thermostatic assembly L'', no intermediate binding post 82 or auxiliary wire connection 81 is provided, and the binding posts 63 and 63' of the relay N'' are connected by wires 166 and 167 with the pair of relatively movable contacts 155 of relay K. When these contacts 155 are brought into engagement by the short circuiting of solenoid 143, the relay N'' will be directly deenergized so as to shut off the valve H'', no matter what the temperature conditions affecting the thermostats L'' may be. It is unnecessary to maintain any minimum temperature in the passage E when the car is out of service, and furthermore it is undesirable that the radiator G'' should operate at all when the refrigerating unit J is in operation. For this reason the connections are such that the selector relay K will completely cut off the radiator G'' whenever the car is taken out of service or the outside thermostat Y registers a predetermined maximum outside temperature.

The thermostatic assembly O which controls the refrigerating mechanism, may be substantially the same as any one of the assemblies L, comprising a high temperature thermostat 168, intermediate temperature thermostat 169 and a low temperature thermostat 170. The manually adjustable switch mechanism Q is essentially the same as the mechanisms M previously described, and according to the adjustment of this switch mechanism one or the other of the thermostats will, at a predetermined temperature, complete a circuit between the two wires 171 and 172 which lead to the panel board. When switch mechanism Q is moved to the so-called "on" position, a permanent connection between wires 171 and 172 is established so that the refrigerating mechanism will be operative no matter what the temperature adjustments of the thermostats may be.

The relay assembly P on the panel board comprises a pilot relay coil 173 which will be energized, whenever a circuit is completed between wires 171 and 172 through the thermostat O or switch Q, by current flowing over the following circuit: From positive main 44 through wire 174, contacts 156 of selector relay K, wire 175, resistance 176, wire 172, wire 171, solenoid coil 173, and wires 177, 13 and 37 to the negative terminal 12. It will be noted that this control circuit cannot be completed unless the selector relay K is deenergized and the contacts 156 are brought in engagement. This will be accomplished when the outside temperature has risen above a certain predetermined temperature, for example 70° Fahrenheit, so as to close the circuit through outside thermostat Y. Until this outside temperature has been reached, the refrigerating mechanism will be inoperative. The energization of pilot relay coil 173 will draw up the core of this relay which is connected through stem 178 with a movable contact member 179 which will be lifted into engagement with a fixed contact 180 so as to complete an energizing circuit for the main relay coil 181, as follows: From positive main 44 through wire 182, solenoid coil 181, wire 183, movable contact member 179, fixed contact 180, and wire 184 to the negative main 185 which leads to the fixed contact 186 of main switch 45 in the actuating circuit for blower-motor 4. It will thus be seen that this relay circuit cannot be completed unless the switch 45 is closed to put the blower motor 4 in operation. It might here be noted that the negative side of the control circuits for heating relay N'' are also completed through this wire 185 instead of through the main negative connection 38 on the panel board. The result is that neither the heating mechanism nor the refrigerating mechanism in passage E will be operative unless the blower motor 4 is put in operation by closing the switch 45. When the relay coil 181 is energized, it will lift the movable contact plate 187 into engagement with the fixed contacts 188 and 189, thus completing an actuating circuit for the refrigerating motor 5 as follows: From positive main 42 through wire 190, fixed contact 189, movable contact 187, fixed contact 188, wire 191, pressure controlled switch 192, motor 5 of refrigerating apparatus K, wire 193, normally closed cut-out switch 194, and wire 195 to the negative main 38. It will thus be seen that whenever the temperature of the air stream flowing through passage E rises above the temperature for which the thermostatic assembly O is adjusted, a circuit will be closed to energize pilot motor 173 which in turn will energize the main relay coil 181, thus closing the actuating circuit for refrigerating motor 5. When the temperature has been lowered so as to break the control circuit through the thermostat which is in control, these several circuits will be successively broken and the motor 5 will cease to operate.

Briefly reviewing some of the main features of this temperature regulating system, it will be noted that the only portions of the control system normally accessible to the occupants of the compartment will be the manually adjustable switches M or M' in the several compartments A and B. By means of these switches the temperatures may be normally adjusted to suit the desire of the occupants. In some compartments such as B, provided with a switch mechanism of the type shown at M', the heat may be entirely cut off if desired, except for the tempered air admitted through the grille 2 from passage 3. In some public rooms such as compartment A, it may not be desirable to permit any unauthorized person to entirely cut off the heat, and for this reason the switch mechanism M is only capable of reducing the temperature maintained to a predetermined minimum. It will be understood that there may be a plurality of each type of compartments A and B, and that each of these will be provided with a control system of the type here shown, all of these systems being controlled through the panel board G. When the car is out of service, the selector switch Z will operate through selector relay X to cause a certain predetermined minimum temperature to be maintained in all of the compartments A and B. The temperature controlling systems G'' and J in the air circulation passage E will neither of them be operative until the blower F is put in operation. The refrigerating mechanisms J and K are inoperative until the outside temperature has risen above a predetermined maximum for which thermostat Y is set. When the outside temperature rises above the predetermined maximum, the heating means G'' in passage E will be rendered entirely inoperative, and the several heating means G and G' in the compartments will only be operative to maintain a certain predetermined minimum temperature. Since the refrigerating means will never lower the temperature to this minimum, the heating means in the compartments are practically inoperative under these conditions. In this manner a single selector relay X is adapted to cooperate with both the pressure-operated selector switch Z and the outside thermostat Y in order to selectively control the operations of the heating and refrigerating mechanisms. In general, all of the mechanisms grouped on the panel board D and the other devices shown in compartment C will only be accessible to the porter or other authorized attendant.

It will be noted that the circuits which include the several thermostatic assemblies and relay mechanisms are entirely independent of the operating circuits for the valves H, although both derive their energy from the same source of power. The lights T are also energized from this same source. A rather heavy current is necessary for energizing the valve operating motors 85 and 86, but this current will normally flow only for a very short time, the operating circuit being broken by the snap switch 91 as soon as the valve movement has been completed. In case one of the valves should stick for any reason and the operating current should flow for an abnormally long length of time, the circuit breaker W will operate to temporarily interrupt this operating circuit. After a certain lapse of time this automatically reclosing circuit breaker will operate to again complete this circuit and in case the trouble is only temporary the circuit will remain closed, but if the trouble still exists, the circuit will again be interrupted and this cycle of events will repeat itself, the signal lamp 123 flashing on and off at intervals to give visible indication of this condition. It would be undesirable to have the thermostatic control and relay circuits interrupted in this manner since the momentary making and breaking of these circuits would be apt to cause incomplete impulses to be given to the valve operating mechanisms which would leave the valves in intermediate or partly opened or closed positions, thus rendering the heating systems inoperative or not properly effective. For this reason the thermostatic circuits do not include the automatic circuit breaker W but are continuously closed, although the currents which flow through the thermostats are kept below a predetermined safe maximum by means of the voltage regulator S which also functions to maintain a proper voltage in the lighting circuit T.

In case trouble develops in one of the valve-operating circuits, as indicated by the flashing of signal light 123 on the panel board, the attendant may, by successively opening the cut-out or snap switches 107 and observing the action of the signal light 123, localize the particular circuit in which the trouble is occurring, and this circuit may be temporarily cut out of service by leaving the switch 107 open until the trouble is removed without affecting the operation of the other circuits.

In order that the refrigerating mechanism and control connections may be tested when the selector relay X is energized or open, a normally open test switch 196 is provided to temporarily connect the wires 174 and 175.

Under some conditions it may be desirable to raise the temperature of certain portions of the car above the minimum provided by thermostats 66 when the car is out of service. For this purpose, the selector switch Z is provided with a cam lever 197 which may be rotated by knob 198 into engagement with spring contact 134 so as to move this contact out of engagement with contact bar 135 and break the shunt circuit through the switch Z. The control devices L and M will then be operative in the normal manner to maintain any selected temperature, as when the car is in service and switch Z is held open by fluid-pressure.

We claim:

1. Apparatus for regulating the temperature within an enclosure comprising a heating means, a refrigerating means, electrically operated control mechanism for each of these means for maintaining a selected one of a plurality of predetermined temperatures within the enclosure, a thermostat positioned outside the enclosure, and electrically operated means including a circuit in which the thermostat is positioned cooperating with the control mechanism for rendering the refrigerating means effective and limiting the heating means to the maintenance of a predetermined minimum temperature when the outside temperature is above a predetermined maximum, and for rendering the refrigerating means ineffective and the heating means effective to maintain higher selected temperatures when the outside temperature is below the predetermined maximum.

2. Apparatus for regulating the temperature within an enclosure comprising a passage through which air is circulated from and back into the enclosure, a blower for enforcing a circulation of air through the passage, a motor for operating the blower, a heating means and a refrigerating means in the passage, electrically operated control mechanisms for each of these means for maintaining selected predetermined temperatures within the enclosure, an actuating circuit for the motor, and means including a switch in this actuating circuit for rendering the control mechanisms ineffective when the blower is not in operation.

3. Apparatus for regulating the temperature within an enclosure comprising a passage through which air is circulated from and back into the enclosure, a blower for enforcing a circulation of air through the passage, a motor for operating the blower, a heating means and a refrigerating means in the passage, an actuating circuit for the motor, and means including a switch in this actuating circuit for rendering the heating and refrigerating means ineffective when the blower is not in operation.

4. Apparatus for regulating the temperature within a railway car comprising a heating means, a refrigerating means, electrically operated control mechanism for each of these means for maintaining a selected one of a plurality of predetermined temperatures within the car, a selector relay operative when closed to render the refrigerating means effective and to limit the operation of the heating mechanism to the maintenance of a predetermined low temperature, and operative when open to render the refrigerating means ineffective, and a thermostat in circuit with the relay and positioned outside the car for closing the relay when a predetermined maximum outside temperature is reached.

5. Apparatus for regulating the temperature within a railway car comprising a heating means, a refrigerating means for maintaining a selected one of a plurality of predetermined temperatures within the car, a selector relay operative when closed to render the refrigerating means effective and to limit the operation of the heating mechanism to the maintenance of a predetermined low temperature, and operative when open to render the refrigerating means ineffective, a thermostat in circuit with the relay and positioned outside the car for closing the relay when a predetermined maximum outside temperature is reached, and a pressure-controlled selector switch connected with a pipe on the car which contains fluid under pressure when the car is in service, said switch also being in circuit with the relay and operative to close the relay when the car is out of service.

6. Apparatus for regulating the temperature within a railway car comprising a passage through which air from within the car is circulated, a blower for enforcing a circulation of air through the passage, a heating means and a refrigerating means in the passage, electrically operated control mechanisms for each of these means for maintaining a selected one of a plurality of predetermined temperatures within the car, a selector relay operative when closed to render the refrigerating means effective and to limit the heating means to the maintenance of a predetermined low temperature, and operative when open to render the refrigerating means ineffective, and a thermostat in circuit with the relay and positioned outside the car for closing the relay when a predetermined maximum outside temperature is reached.

7. Apparatus for regulating the temperature within a railway car comprising a passage through which air from within the car is circulated, a blower for enforcing a circulation of air through the passage, a heating means and a refrigerating means in the passage, electrically operated control mechanisms for each of these means for maintaining a selected one of a plurality of predetermined temperatures within the car, a selector relay operative when closed to render the refrigerating means effective and to limit the heating means to the maintenance of a predetermined low temperature, and operative when open to render the refrigerating means ineffective, a thermostat in circuit with the relay and positioned outside the car for closing the relay when a predetermined maximum outside temperature is reached, and a pressure controlled selector switch connected with a pipe on the car which contains fluid under pressure when the car is in service, said switch also being in circuit with the relay and operative to close the relay when the car is out of service.

8. Apparatus for regulating the temperature within an enclosure comprising a passage through which air is circulated from and back into the enclosure, a blower for enforcing a circulation of air through the passage, an inlet for admitting fresh air into the passage from outside the enclosure, a heating means in the passage, a heating means in the enclosure, mechanism comprising thermostatic means in the passage and response to the temperature of the air drawn into the passage for controlling the heating means within the passage, and mechanism comprising thermostatic means responsive to the temperature within the enclosure for controlling the heating means within the enclosure.

9. Apparatus for regulating the temperature within an enclosure comprising a passage through which air is circulated from and back into the enclosure, a blower for enforcing a circulation of air through the passage, an inlet for admitting fresh air into the passage from outside the enclosure, a heating means in the passage, a heating means in the enclosure, mechanism comprising thermostatic means in the passage and responsive to the temperature of the air drawn into the passage for controlling the heating means within the passage, mechanism comprising thermostatic means responsive to the temperature within the enclosure for controlling the heating means within the enclosure, and means comprising a thermostat positioned outside the enclosure and responsive to a predetermined maximum outside temperature for cooperating with the first mentioned thermostatic means to render the heating means in the passage temporarily inoperative, and cooperating with the second mentioned thermostatic means to cause a predetermined minimum temperature to be maintained in the enclosure by the second mentioned heating means.

10. Apparatus for regulating the temperature within an enclosure divided into a plurality of separate compartments, comprising a plurality of separate heating means one in each compartment, a separate thermostatic means for each compartment and responsive to temperature changes therein for controlling the heating means in that compartment to separately maintain a selected predetermined temperature in that compartment, and means comprising a thermostat positioned outside the enclosure and responsive to a predetermined maximum outside temperature and a control relay responsive to the thermostat for cooperating with the several thermostatic means to maintain only a predetermined minimum temperature in all of the compartments.

11. Apparatus for regulating the temperature within an enclosure divided into a plurality of separate compartments, comprising a passage through which air is circulated, said passage having an inlet leading from the enclosure and an inlet from the outside air, and a plurality of outlets leading separately into the several compartments, a blower for enforcing a circulation of air through the passage, a heating means in the passage, a separate heating means in each compartment, mechanism comprising thermostatic means positioned in the passage and responsive to the temperature of the air drawn into the passage for controlling the heating means within the passage, and separate mechanisms, one for each compartment, each comprising a thermostatic means responsive to temperature changes in the compartment for separately controlling the heating means in that compartment to maintain a selected predetermined temperature in that compartment.

12. Apparatus for regulating the temperature within an enclosure divided into a plurality of separate compartments, comprising a passage through which air is circulated, said passage having an inlet leading from the enclosure and an inlet from the outside air, and a plurality of outlets leading separately into the several compartments, a blower for enforcing a circulation of air through the passage, a heating means in the passage, a separate heating means in each compartment, mechanism comprising thermostatic means positioned in the passage and responsive to the temperature of the air drawn into the passage for controlling the heating means within the passage, separate mechanisms, one for each compartment, each comprising a thermostatic means responsive to temperature changes in the compartment for separately controlling the heating means in that compartment to maintain a selected predetermined temperature in that compartment, and means comprising a thermostat positioned outside the enclosure and responsive to a predetermined maximum outside temperature for cooperating with the several thermostatic means to render the heating means in the passage temporarily inoperative, and the several heating means in the compartments operative only to maintain a predetermined minimum temperature.

13. Apparatus for regulating the temperature within an enclosure divided into a plurality of separate compartments, comprising a passage through which air is circulated, said passage having an inlet leading from the enclosure and an inlet from the outside air, and a plurality of outlets leading separately into the several compartments, a blower for enforcing a circulation of air through the passage, a heating means in the passage, a refrigerating means in the passage, mechanism comprising thermostatic means in the passage and responsive to the temperature of the air drawn into the passage for controlling the heating and refrigerating means therein to maintain the air discharged into the compartments at a selected predetermined temperature, a separate heating means in each compartment, separate mechanism for each compartment comprising thermostatic means responsive to temperature changes in that compartment for controlling the heating means in the compartment to separately maintain a selected predetermined temperature therein, and means comprising a thermostat positioned outside the enclosure and cooperating with the thermostatic means within the enclosure to render the heating means ineffective when a predetermined maximum outside temperature is reached, and to render the refrigerating means ineffective when the outside temperature is below this predetermined maximum.

PAUL B. PARKS.
WILLIAM M. SMITH.